US010965676B2

(12) United States Patent
Girdhar

(10) Patent No.: US 10,965,676 B2
(45) Date of Patent: Mar. 30, 2021

(54) PEER AUTHENTICATION BY SOURCE DEVICES

(71) Applicant: CA, Inc., New York City, NY (US)

(72) Inventor: Dhiraj Girdhar, Westborough, MA (US)

(73) Assignee: CA, Inc., San Jose, CA (US)

( * ) Notice: Subject to any disclaimer, the term of this patent is extended or adjusted under 35 U.S.C. 154(b) by 245 days.

(21) Appl. No.: 16/149,807

(22) Filed: Oct. 2, 2018

(65) Prior Publication Data
US 2020/0106779 A1    Apr. 2, 2020

(51) Int. Cl.
*H04L 29/06*         (2006.01)

(52) U.S. Cl.
CPC .......... *H04L 63/10* (2013.01); *H04L 63/0876* (2013.01); *H04L 63/0884* (2013.01)

(58) Field of Classification Search
CPC .. H04L 63/10; H04L 63/0884; H04L 63/0876
USPC .......................................................... 726/4
See application file for complete search history.

(56) References Cited

U.S. PATENT DOCUMENTS

| | | | | |
|---|---|---|---|---|
| 6,956,949 B1* | 10/2005 | Faber | ....................... | G06F 21/10 348/E7.056 |
| 7,350,074 B2* | 3/2008 | Gupta | ................. | H04L 63/0823 713/157 |
| 2003/0063771 A1* | 4/2003 | Morris | ................ | H04L 67/1072 382/100 |
| 2003/0105812 A1* | 6/2003 | Flowers, Jr. | .......... | H04L 69/329 709/203 |
| 2004/0054885 A1* | 3/2004 | Bartram | ................ | H04L 67/104 713/152 |
| 2004/0148504 A1* | 7/2004 | Forsberg | ............... | H04L 63/162 713/168 |
| 2004/0199667 A1* | 10/2004 | Dobbins | ............... | H04L 63/123 709/240 |
| 2006/0037072 A1* | 2/2006 | Rao | ......................... | H04L 47/10 726/14 |
| 2007/0121596 A1* | 5/2007 | Kurapati | ............ | H04M 7/0078 370/356 |
| 2007/0198633 A1* | 8/2007 | Thibeault | ................ | H04L 67/26 709/203 |

(Continued)

OTHER PUBLICATIONS

Åslund, Jonas. "Authentication in peer-to-peer systems." (2002). (Year: 2002).*

(Continued)

*Primary Examiner* — Syed A Zaidi
(74) *Attorney, Agent, or Firm* — Shook, Hardy & Bacon L.L.P.

(57) ABSTRACT

A first request and a first identifier corresponding to an identity of a first source device that initiated the first request is received. At least a second source device is queried to obtain information indicative of whether the first source device is authorized to complete the first request. The second source device is configured to periodically gather and transmit data, over one or more networks, to one or more local processing devices or one or more remote devices for data analysis. The first request is blocked or authorized to proceed based at least in part on whether at least the first source device is authorized to complete the first request.

18 Claims, 9 Drawing Sheets

(56) References Cited

U.S. PATENT DOCUMENTS

| | | | | |
|---|---|---|---|---|
| 2007/0220116 A1* | 9/2007 | Rose | ............... | H04L 67/104 709/219 |
| 2008/0040606 A1* | 2/2008 | Narayanan | ............... | H04L 63/10 713/169 |
| 2009/0158394 A1* | 6/2009 | Oh | ............... | G06F 21/31 726/3 |
| 2009/0287837 A1* | 11/2009 | Felsher | ............... | G16H 10/60 709/229 |
| 2009/0288138 A1* | 11/2009 | Kalofonos | ............... | H04L 63/0884 726/2 |
| 2010/0287611 A1* | 11/2010 | Blom | ............... | H04L 63/10 726/21 |
| 2012/0216244 A1* | 8/2012 | Kumar | ............... | G06F 21/57 726/1 |
| 2016/0066004 A1* | 3/2016 | Lieu | ............... | H04N 21/44204 725/29 |
| 2016/0080486 A1* | 3/2016 | Ram | ............... | H04L 12/1822 709/205 |
| 2017/0012959 A1* | 1/2017 | Sierra | ............... | H04L 63/083 |

OTHER PUBLICATIONS

Zhang, Yu, et al. "Access control in peer-to-peer collaborative systems." 25th IEEE International Conference on Distributed Computing Systems Workshops. IEEE, 2005. (Year: 2005).*
NPL Search Results (Year: 2020).*
NPL Search Terms (Year: 2020).*

* cited by examiner

PEER AUTHENTICATION BY SOURCE DEVICES

BACKGROUND

Various tangible everyday items (e.g., automobiles, coffee makers, washing machines, lamps etc.) are increasingly becoming equipped with computing components (e.g., transceivers, processors, storage devices) to form one or more interconnected computer networks that perform various tasks. For example, such networks may be or include an Internet of Things (IoT) network, which is a network of interconnected items that are each provided with unique identifiers (e.g., UIDs) and computing logic so as to communicate or transfer data with each other or other components. Such communication can happen without requiring human-to-human or human-to-computer interaction. For example, an IoT network may include one or more interconnected home devices (e.g., a thermostat, a television, a door lock) that are configured to be automatically activated (e.g., turn on a television without a user selection) in response to an input (e.g., a particular clock-time).

SUMMARY

This Summary is provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

Embodiments of the technology described herein are directed to a computer-implemented method, a system, and a computer program product. In some embodiments, the computer-implemented method includes the following operations. A remote device receives a first data transfer request and a first identifier corresponding to an identity of a first source device that initiated the data transfer request. In response to the receiving of the first data transfer request and the first identifier, the remote device transmits a first authentication request to a second source device and at least a third source device. The first authentication request is indicative of querying the second source device and the third source device to obtain information indicating whether the second source device and the third source device recognize the first source device. The second source device and the third source device are configured to periodically gather and transmit respective sets of data to one or more local processing devices for processing the respective sets of data. The one or more local processing devices are configured to transmit at least a portion of the respective sets of data to the remote device. The remote device denies or allows the first data transfer request to proceed based at least in part on whether the second source device and the third source device recognize the first source device.

In some embodiments the system includes at least one source device having at least one processor and at least one computer readable storage medium having program instructions embodied therewith. In particular embodiments, the program instructions are readable or executable by the processor to cause the system to perform the following operations. A first request that includes a first identifier identifying a second source device is received. The first request is indicative of a query of whether the first source device verifies an identity of the second source device in order to complete a second request submitted by the second source device to transfer data. It is determined whether second source device is authenticated. Based at least in part on the determining whether the second source device is authenticated, a remote device is issued a notification indicating whether the second source device is authenticated. The remote device denies or allows the second source device to complete the second request to transfer the data based at least in part on whether the first device verifies the identity of the second device.

In some embodiments, the computer program product includes a computer readable storage medium having program instructions embodied therewith. In some embodiments, the program instructions are readable or executable by at least one processor to cause the at least one processor to perform the following operations. A first request and a first identifier corresponding to an identity of a first source device that initiated the first request is received. At least a second source device is queried to obtain information indicative of whether the first source device is authorized to complete the first request. The second source device is configured to periodically gather and transmit data, over one or more networks, to one or more local processing devices or one or more remote devices for data analysis. The first request is blocked or authorized to proceed based at least in part on whether at least the first source device is authorized to complete the first request.

BRIEF DESCRIPTION OF THE DRAWINGS

Aspects of the technology presented herein are described in detail below with reference to the attached drawing figures, wherein.

DETAILED DESCRIPTION

Figure 1:
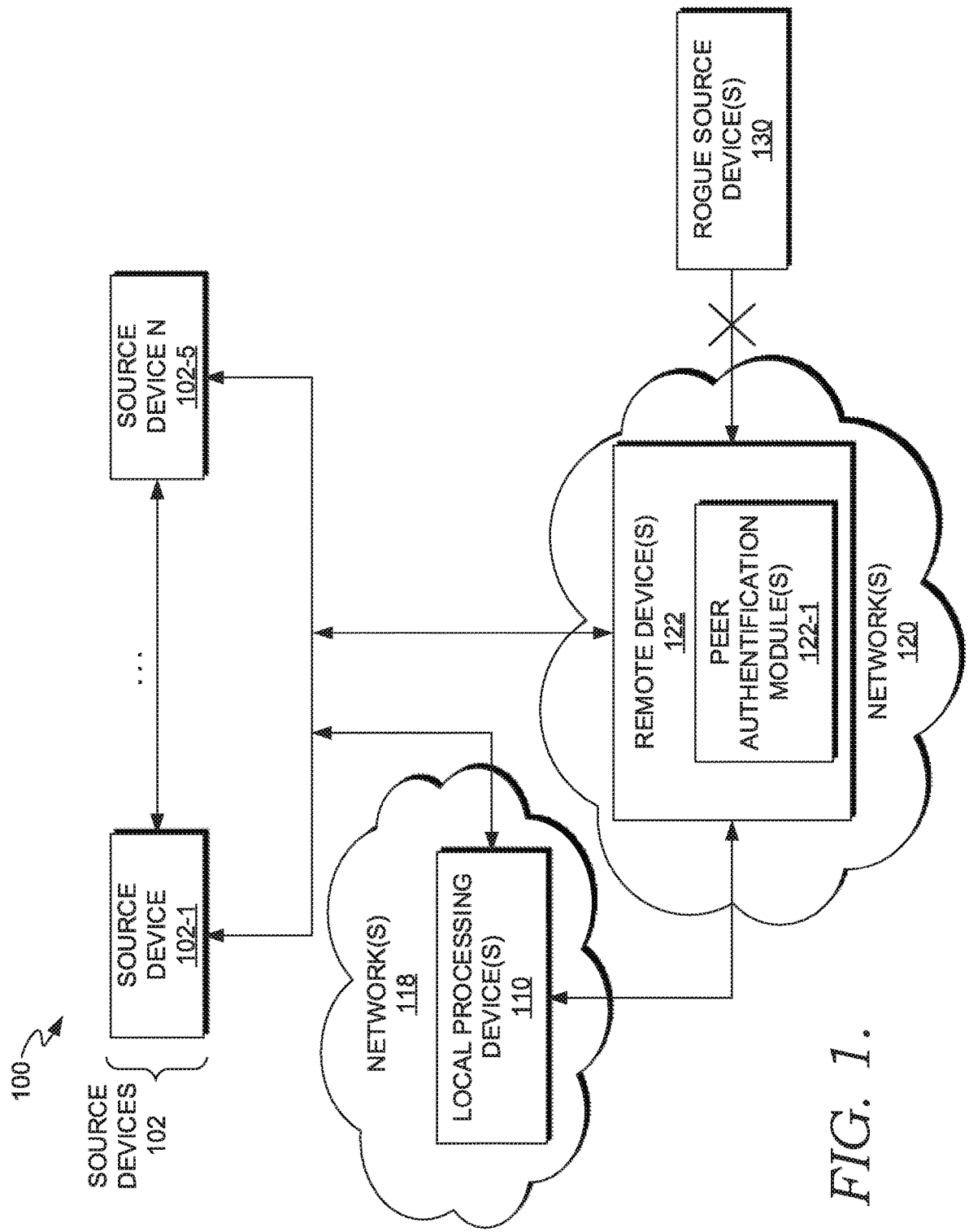
FIG. 1 is a block diagram of a computing environment in which particular aspects of the present disclosure are implemented in, according to some embodiments.

The subject matter of aspects of the present disclosure is described with specificity herein to meet statutory requirements. However, the description itself is not intended to limit the scope of this patent. Rather, the inventors have contemplated that the claimed subject matter also might be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described. As used herein, the singular forms "a," "an," and "the" are intended to include the plural forms as well, unless the context clearly indicates otherwise.

It is estimated that 5.5 million new items get connected via IoT networks every day and by the year 2020, it is predicted that the world will include 20.8 billion connected items (compared to only 6.4 billion items connected in 2017). With this fast projected rise in the popularity of connected items, data and network security is a serious concern. In various interconnected networks, such as IoT networks, connected devices share data in order to distribute information. For example, a smoke alarm source device that detects a fire can send sensitive and important information (e.g., an alert indicating that a fire has started) to a service, which responsively causes one or more other devices to employ additional functionality (e.g., cause an actuator source device to turn on water sprinklers when the associated alert is received). While the collaboration and information exchange among these items and services can play a key role for various entities or organizations, authenticating these items can be crucial in order to avoid un-intended information leaks, data sniffing, and/or unauthorized write or transfer operations. For example, a malicious rogue device may transfer sensor data to a service indicating that there is no fire (when in fact there is), which causes an item, such as a sprinkler, not to function as it should.

Existing security computing devices and antivirus software solutions do not adequately counter the challenges of cyber security threats on these connected networks. Machine-to-machine (M2M) authentication is one technical solution example. M2M authentication is a way to establish machine-to machine communication through verification of a digital certificate (e.g., a PKI certificate) or digital credentials (e.g., a shared secret such as passphrase, a private key, etc.). However, if these digital certificates or digital credentials of devices are compromised, then any unauthorized rogue device outside of the network can write or read sensitive information. With the rise of particular hacking techniques, such as brute force attacks, these authentication mechanisms are becoming a serious vulnerability for these networks.

Various embodiments of the present disclosure improve these existing technologies via multiple source devices that check with each other to determine whether a device is recognized. For example, instead of a remote device (e.g., a service) authenticating a request by a first device via a passphrase or other credential, the remote device issues an authentication request to one or more source devices (e.g., a smart thermostat) and these source devices certify that they recognize the first device (e.g., as being within the network) in particular embodiments. Based at least in part on whether the source devices recognize the first device, the request by the first device is denied/blocked or allowed/authenticated. Particular embodiments of the present disclosure additionally or alternatively improve existing technologies via some or each of the operations discussed with respect to FIGS. 1-9, as described in more detail herein.

FIG. 1 is a block diagram of a computing environment 100 in which aspects of the present disclosure are employed in, according to certain embodiments. Although the environment 100 illustrates specific components at a specific quantity, it is understood that more, less, or different components may be included in the computing environment 100. For example, in some embodiments, the networks 118 and 120 are included in a same or larger network (e.g., the internet). In some embodiments there is only one network, as opposed to two networks as illustrated in FIG. 1. In another example, in some embodiments, there are no local processing device(s) 110. Accordingly, in these embodiments, the source devices 102 communicate directly with the remote device(s) 122 via one or more networks 120. In yet another example, in some embodiments there are more than the two source devices 102-1, and 102-5, such as 5, 10, 20, etc.

The source devices 102 (102-1 and 102-5) are communicatively coupled to the one or more local processing devices 110 and one or more remote devices 122 via the one or more networks 118 and 122. In practice, the networks 118 and/or 122 may be any viable data transport network, such as, for example, a LAN or WAN. For example, these networks can be or include a local area network (LAN), a wide area network (WAN) such as the Internet, or a combination of the two, and include wired, wireless, or fiber optic connections. In general, network(s) 118 and 122 can be any combination of connections and protocols that will support communications between the gateway device(s) 110, the remote device(s) 122, and/or the source device(s) 102. In an example illustration, in some embodiments, the network(s) 118 is or includes a LAN or mesh network. A mesh network is a network where each device (node) is connected to each other and data moves from device to device as opposed to being a hub and spoke network connected where each of the devices (e.g., the source devices 102) are each connected to each other via a single hub or access point. Accordingly, in particular embodiments the network(s) 118 may be a smaller network that is associated with a gateway into one or more larger networks 120 (e.g., the internet).

The source devices 102 are configured to sample or provide data to the one or more local processing devices 110 and/or the remote device(s) 122. A "source device" as described herein is or includes any suitable computing device, sensor, and/or tangible item (e.g., a household item) with computing components (e.g., a transceiver, memory, processor, etc.). A source device is configured to monitor, measure, sample, and/or obtain data (e.g., in near-real time) and transmit the data to one or more other devices (e.g., the local processing device(s) 110) for further processing. Source devices can be categorized as consumer devices or products (e.g., smart home devices, such as a thermostat, door lock, etc.) which are any objects with computing components that a consumer can buy, enterprise devices (e.g., delivery vehicles with sensors located on the trucks) which are objects with computing components that businesses use, and industrial devices (e.g., smart meters) which are objects that specific environments (e.g., cities, towns, states, etc.) use. For example, in various embodiments, a source device is or is included in one or more: smart TVs, smart speakers, wearable devices, toys, smart air conditioning, smart lighting, smart thermostats, doorbell systems, cameras, security cameras, garage opener system, door locking systems, healthcare products, etc. As described in more detail below, the source devices 102 also authenticate and/or authorize source devices to complete requests. In some embodiments, source devices are configured to periodically (e.g., every 1 minute) gather and transmit respective sets of data to the one or more local processing device(s) 110 for local processing.

The one or more local processing devices 110 are one or more computing devices that are configured to store and process, over the network(s) 118, all of the data transmitted from the source devices 102 and then responsively transmit, over the network(s) 120, either a subset or all of the received or respective sets of data to the one or more remote device(s) 122. In some embodiments, the local processing device(s) 110 is a mesh or other network of microdata centers or edge nodes that process and store local data received from the source devices 102 and push or transmit some or all of the data to a cloud device or a corporate data center (e.g., the remote device(s) 122). In some embodiments, the local processing device(s) store all of the data transmitted from the source devices 102 and only transmit selected (e.g., data that meets a threshold) or important data to the remote device(s) 122. Accordingly, the non-important data or the data that is in a group that does not meet a threshold is not transmitted. For example, some or each of the source devices 102 can sample or monitor data in near real-time or every Nth quantity of time (e.g., every 5 seconds) in order to determine whether a condition or threshold within the data has been met (e.g., a data point shows that a fire has been started). Accordingly, only after the condition or threshold has been met, do the local processing device(s) 110 transmit the data that meets or exceeds the threshold to the remote device(s) 122 such that the remote device(s) 122 can take responsive actions, such as notify a user mobile device indicating the threshold has been met and/or cause a modification of one or more of the source devices 102 (e.g., cause sprinklers to be activated via a control signal). The data that does not meet or exceed the threshold is not transmitted in particular embodiments. In various embodiments where the threshold or condition is not met, daily or other time period reports are periodically generated and transmitted from the local processing device(s) 110 to the remote device(s) 122 indicating all the data readings gathered at the source devices 102 and processed at the local processing device(s) 110.

In some embodiments, the local processing device(s) 110 are integrated into or are adjacent to one or more base stations or cell towers. In this way, the local processing device(s) 110 are "local" or closer to the source devices 102 (e.g., within a one-mile radius) than the remote device(s) 122. In some embodiments, the one or more local processing devices 110 act as a buffer or gateway between the network(s) 118 and a broader network, such as the one or more networks 120. Accordingly, in these embodiments, the one or more local processing devices can be associated with one or more gateway devices that translate proprietary communication protocols into other protocols, such as internet protocols.

The one or more remote device(s) 122 are one or more computing devices that receive particular data, analyze the data, and take responsive actions based on the analyzing. For example, the remote device(s) 122 can be one or more service devices (e.g., a smart home service, smart vehicle service, smart speaker service), cloud computing or distributed devices, or corporate data centers. The remote device(s) 122 include the peer authentication module(s) 122-1, which includes logic for issuing a peer authentication request so that one or more of the source devices 102 can authenticate a particular request from another of the source devices 102, which is described in more detail herein. For example, one or more rogue devices 130 can request from the one or more remote device(s) 122 to transmit data. The remote device(s) 122, via the peer authentication module(s) 122-1, may then issue a peer authentication request to check if any or all of the source devices 102 can verify the identity of the one or more rogue source devices 130. If one or more of the source devices 102 do not recognize the rogue source device(s) 130, the remote device(s) 122 can then block or invalidate the request. In some situations, the rogue device(s) 130 are within the network(s) 120 and/or 118. In these situations, although these rogue devices are authenticated or their identify can be verified, they may engage in one or more actions that they are not authorized to do.

In an example illustration of how regular processing occurs along with authentication, the source device 102-1 in particular embodiments may be a smart meter that measures energy, water or natural gas consumption of a building or home. The smart meter may record when and how much resources are consumed at near real-time of a building or home. Responsively, the source device 102-1 may transmit these readings to the one or more local processing devices 110. The local processing device(s) 110 process the data and transmit some or all of the data (e.g., selected readings indicating high gas consumption) to the remote device(s) 112 (e.g., a metering service server). The one or more remote devices 112 may then responsively authenticate, via the peer authentication module(s) 122-1, the identity of the source device 102-1 by querying source device N 102-5 to see if 102-5 N recognizes source device 102-1 (described in more detail herein). If the remote device(s) 122 receives a notification that the source device N 102-5 recognizes source device 102-1, the remote device(s) 122 then cause at least one of the source device(s) 102 to automatically adjust in particular embodiments. For example, the remote device(s) 122 can control heating, ventilation, and air conditioning, if the smart meter is reading that the air conditioning is hot or cold over a threshold.

Figure 2:
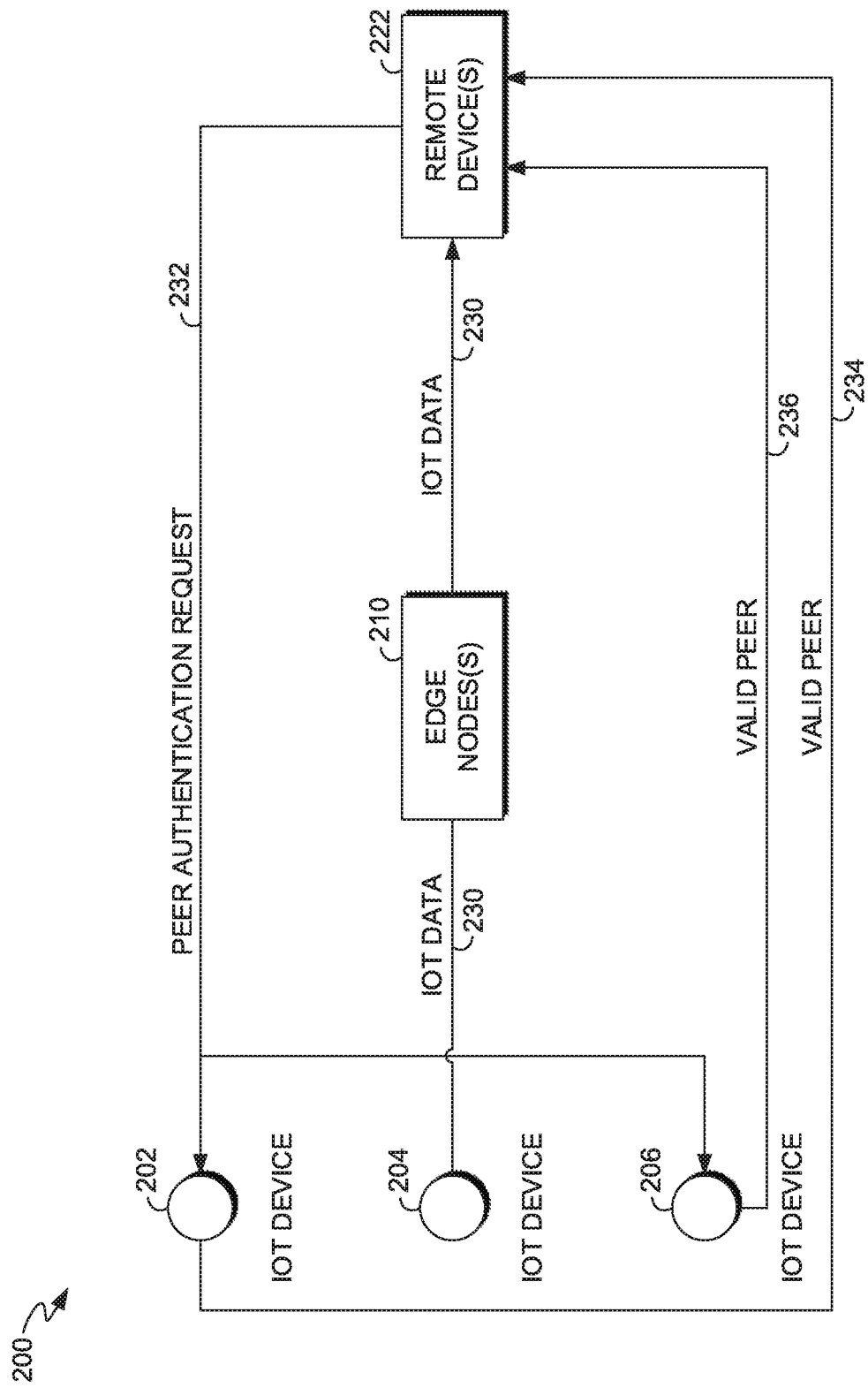
FIG. 2 is a schematic diagram illustrating authentication of a valid source device in an IoT computing environment, according to some embodiments.

FIG. 2 is a schematic diagram illustrating authentication of a valid source device in an IoT computing environment 200, according to some embodiments. Although FIG. 2 (and FIGS. 3-6) describe various specific components at a specific quantity, it is understood that any suitable environment can be used with any suitable type and quantity of components. For example, in some embodiments, there may be more or few IoT devices that 202, 204, and 206. In another example, in some embodiments, the environment 200 is not strictly an IoT network but can be or include other suitable networks, such as a cloud computing network for example. In some embodiments, the environment 200 (and/or the other environments associated with FIGS. 3-6) is or is included in the network environment 100 of FIG. 1. For example, in some embodiments the IoT devices 202, 204, and 206 represent the source devices 102 of FIG. 1, the edge node(s) 210 represent the local processing device(s) 110 of FIG. 1, and the remote device(s) 222 represent the remote device(s) 122 of FIG. 1. In some embodiments, some or each of the processes described in FIG. 2 through FIG. 6 are processes carried out via the peer authentication module(s) 221-1 of FIG. 1.

FIG. 2 illustrates that the IoT device 204 is authenticated and able to proceed with its IoT data request. The IoT device 204 first issues the IoT data request 230 to the edge node(s) 210, which may be a first data transfer request indicative of a request to transfer data obtained or measured in some environment. The request can include a first identifier corresponding to an identify of the IoT device 204 (e.g., a UID). The edge node(s) 210 receives, processes, and transmits the request 230 to the remote device(s). The edge node(s) 210 also transmit the first identifier to the remote device(s) 222. An "edge node" as described herein processes data local to the IoT devices, such as in or adjacent to a cell tower. In some embodiments, the edge node is or includes an automobile, a laptop, mobile device, or other suitable computing device. In some embodiments, the IoT data request 230 (or any data transfer request described herein) surpasses the edge node(s) 210 (or any local processing computing device) and goes straight to the remote device(s) 222 such that the edge node(s) 210 does not initiate communication between the IoT device 204 and the remote device(s) 222.

In response to the receiving of the IoT data request 230 and the first identifier, the remote device(s) 222 transmits a peer authentication request 232 to both the IoT device 202 and IoT device 206. The peer authentication request 232 is a first authentication request indicative of querying the IoT device 202 and IoT device 206 to obtain information indicating whether the IoT device 202 and 206 recognize the IoT device 204. The peer authentication request 232 may include the first identifier. When a particular IoT device or source device "recognizes" another source device, it means that the particular source device verifies the identity of the other source device, authenticates the other source device based on analyzing the first identifier, and/or another source device fits a predetermined set of criteria or rules. For example, in some embodiments, one or more source devices includes a data structure (e.g., a list) that includes identifiers of each source device within a network of interconnected devices (e.g., within a network of home connected devices, such as the network(s) 118 of FIG. 1). Accordingly, if the first identifier matches an identical identifier in the data structure, the source device "recognizes" or authenticates the source device. In some embodiments, the particular source device additionally or alternatively recognizes other source devices via inference-based methods based on factors, such as timestamps, which is described in more detail herein. Authentication can correspond to a first source device verifying that a second source device is in fact what the second source device purports to be.

Responsive to the IoT devices 202 and 206 receiving the peer authentication request 232, they each respectively transmit a valid peer notification (i.e., valid peer 236 and valid peer 234) back to the remote device(s) 222, which is indicative of a notification indicating that both the IoT devices 202 and 206 recognize or have validated the identity of IoT device 204. In response to receiving the valid peer notifications 236 and 234, the remote device(s) 222 allow or select the IoT data request 230 to proceed based at least in part on whether the IoT devices 202 and 206 recognize the IoT device 204. In some embodiments, the IoT data request 230 before authentication corresponds to initial communication between the IoT devices and the remote device(s) 222 to establish a connection of a session. Accordingly, after the valid peer requests 236 and 234 are received, the session may be continued such that a data payload or actual transfer data (e.g., sensor reading data) is transmitted to the remote device(s) 222.

Although FIG. 2 illustrates that a peer authentication request 232 is not made to the source device 204, in some embodiments, the peer authentication request 232 is made to the source device 204, such that the source device 204 can send its only valid peer request, which is indicative of a query of whether the source device 204 recently transmitted the IoT data request 230.

Figure 3:
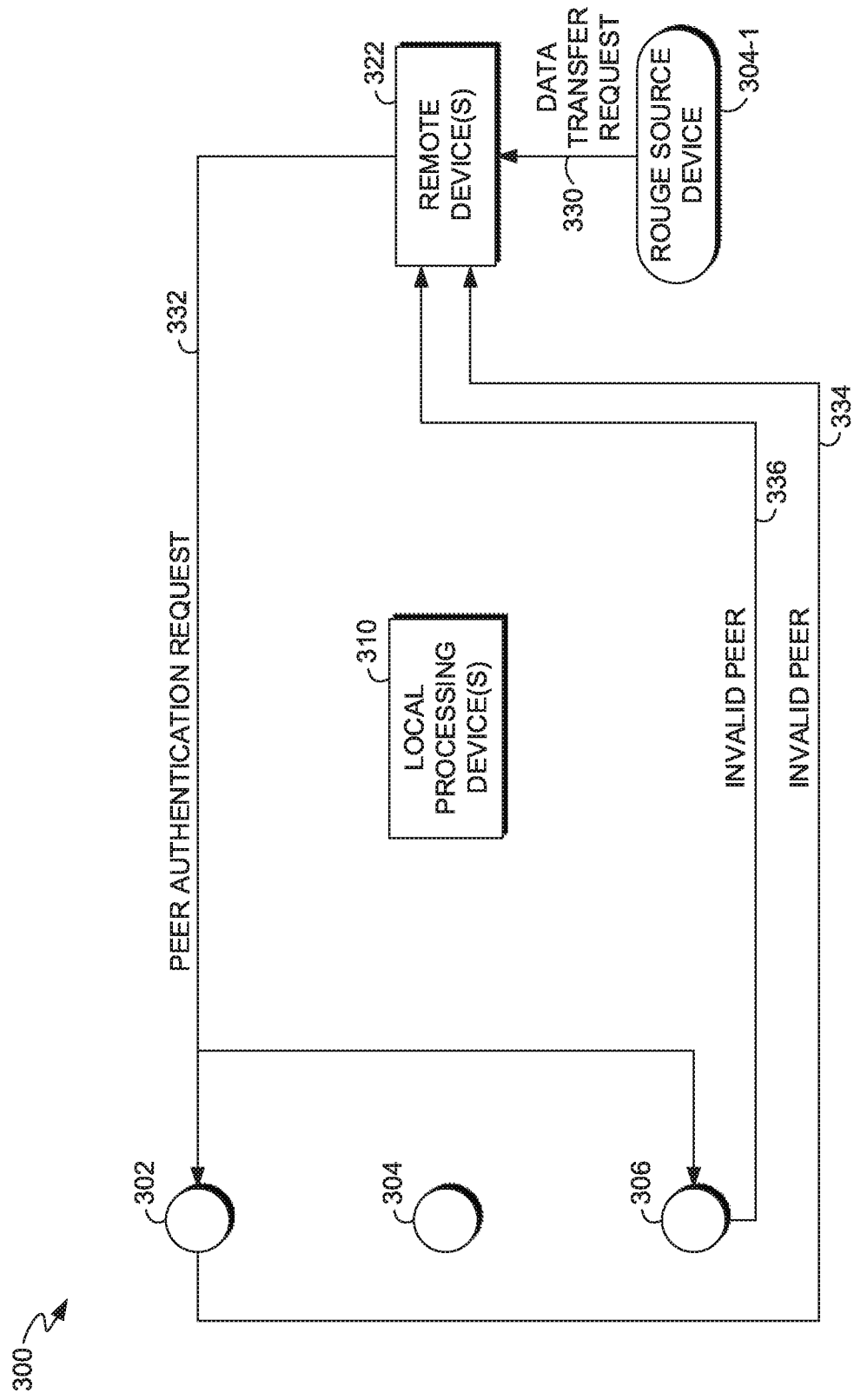
FIG. 3 is a schematic diagram illustrating denial of an invalid source device in a computing environment, according to some embodiments.

FIG. 3 is a schematic diagram illustrating denial of an invalid source device in a computing environment 300, according to some embodiments. In some embodiments, some or each of the components in FIG. 3 are the same or analogous to the components in FIG. 2 and/or FIG. 1. For example, in some embodiments, the source devices 302, 304, and 306 represent the source devices 102 of FIG. 1. Likewise, the local processing device(s) 310 and remote device(s) 322 represent the local processing devices 110 and/or the remote device(s) 122 of FIG. 1

The rogue source device 304-1 (e.g., a device that includes malware) issues the data transfer request 330, which includes an identifier of its identity. In some instances, the rogue source device 304-1 transmits an identifier identical to or associated with the source device 304 such that it is trying to mimic the identity or functions associated with the source device 304. The remote device(s) 322 receives the data transfer request 330 and the identifier. Responsively, the remote device(s) 322 transmits the peer authentication request 332 (an authentication request) and identifier to both the source devices 302 and 306 to determine whether the source devices 302 and 306 recognize the source device 304-1. In some embodiments, although the source devices 302 and 306 may confirm the identity of the source device 304-1 (i.e., because it has the same identifier as 304 as indicated in a data structure), these source devices 302 and 306 perform additional processing to verify the identity of the rogue source device 304-1. For example, in some embodiments the source devices 302 and 306 each store rules that specify when data transfers or data transfer requests are made (e.g., every 1 minute) by some or each other source device in a network. If the transmission data request 230, for example, does not conform to these rules or occurs outside of a threshold time period defined by the rules, the rogue source device 304-1 is not recognized even though it may include the same functions or identifier as the source device 304.

In response to the source device 302 and source device 306 not recognizing the rogue source device 304 1, they each respectively transmit an "invalid peer" notification (i.e., notifications 334 and 336) to the remote device(s) 322, which is indicative of a notification indicating that they do not recognize the rogue source device 304-1. In some embodiments, the reasons for the non-recognition are provided (e.g., a violation of one or more rules, even though there was an identifier match). In response to the receiving of these invalid peer requests 336 and 334, the remote device(s) 322 denies or blocks the data transfer request 330, such that the remote device(s) 322 does not receive a payload from the rogue source device 304-1 This may effectively keep the remote source device(s) 322 from becoming infected with malware and/or allowing unauthorized processes to occur within the computing environment 300.

Although FIG. 3 illustrates that a peer authentication request 332 is not made to the source device 304, in some embodiments, the peer authentication request 332 is made to the source device 304, such that the source device 304 can send its only valid peer request, which is indicative of a query of whether the source device 304 recently transmitted the IoT data request 330.

Figure 4:
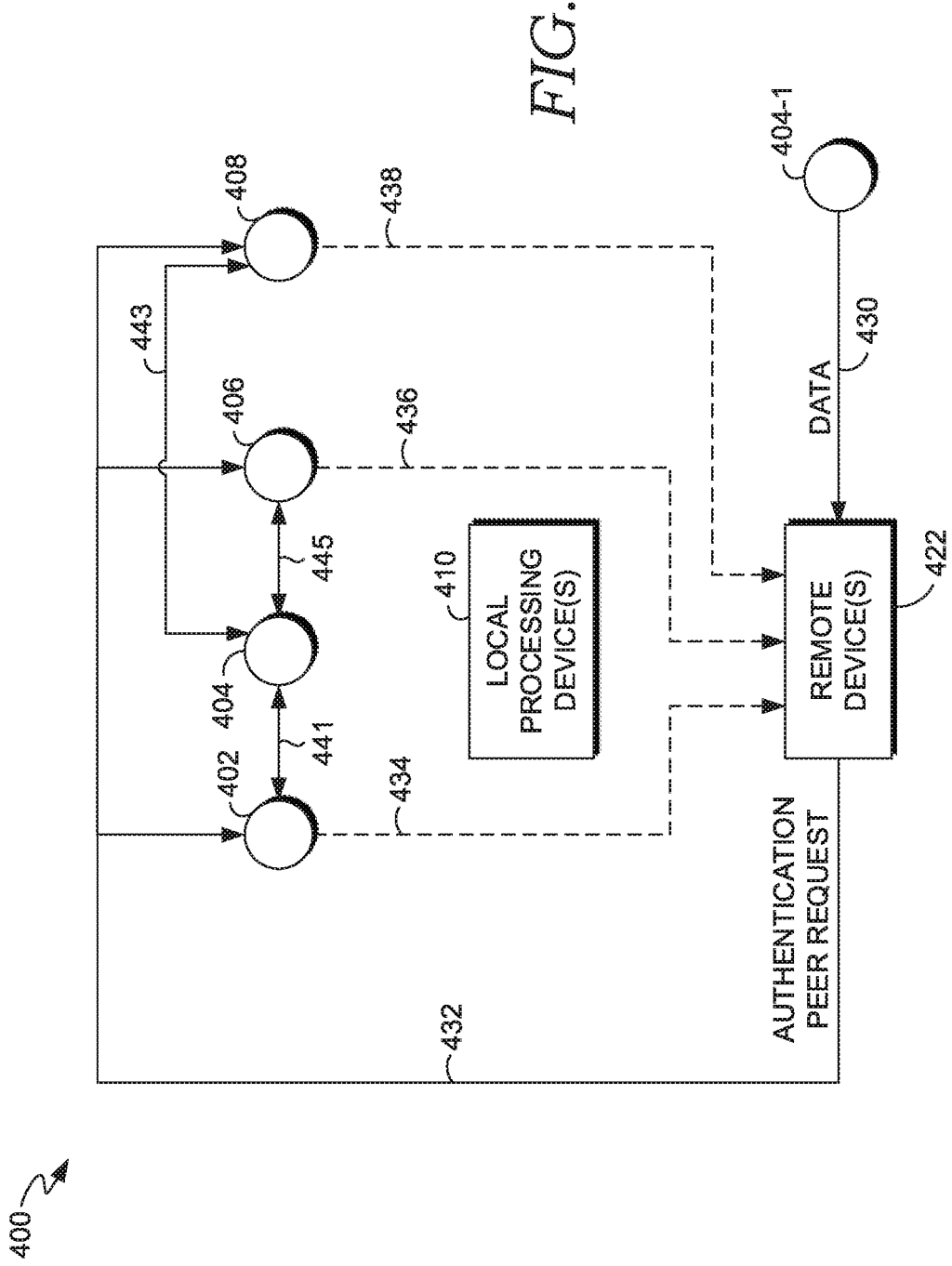
FIG. 4 is a schematic diagram illustrating how source devices can be validated in a computing environment, according to some embodiments.

FIG. 4 is a schematic diagram illustrating how source devices can be validated in a computing environment 400, according to some embodiments. The source device 404-1 issues a data request 430 (e.g., a request to transfer a payload to the remote device(s) 422) and an identifier identifying the source device 404-1. In some embodiments, the remote device(s) 422 (an/or any other remote devices described herein) generate a timestamp of when data transfer requests are received (e.g., the data request 430). The source device 404-1 may or may not be a legitimate authorized device. In response to the receiving of the data request 430, the remote device(s) 422 issue the peer authentication request to the source devices 402, 406, and 408, which is indicative of a query to these devices inquiring whether these devices recognize the source device 404-1. In some embodiments, the peer authentication request 432 (or any other authentication request described herein) includes the time stamp generated.

In some embodiments, and as illustrated in FIG. 4, the source devices 402, 406, and 408 may each query the source device 404 (the identity that matches the identifier in the data request 430) to determine whether the source device 404 just issued the data request 430. Specifically, source device 402 sends the query 441 to source device 404, source device 406 sends the query 445 to the source device 404, and source device 408 sends the query 443 to source device 404, each asking if the source device 404 is the source device that just transmitted data. In various embodiments, the queries 441, 445, and 443, each include the timestamp generated by the remote device(s) 422. The source device 404 may responsively look within a data structure of timestamps that indicate its data transmission time. The source device 404 then determines if the time stamp generated by the remote device(s) 422 match or are within a threshold of timestamps of when it made any transmissions. If there is a match or the timestamps occurred within a threshold time period (e.g., within 1 second of each other), the source device 404 sends a notification back to each of the source devices 402, 404, and 406 indicating that it sent the request 430. Each of the source devices 402, 406, and 408 may then responsively transmit the respective notifications 434, 436, and 438 to the remote device(s) 422 indicating that the source device 404-1 is recognized or is allowed to proceed with its request. The remote device(s) 422 may then allow the data request 430 to proceed or the payload to be transferred. Likewise, if there is not a match or the timestamps occurred outside of a threshold time period, the source device 404 sends a notification back to each of the source devices 402, 404, and 406 indicating that it did not send the data request 430. Each of the source devices 402, 406, and 408 may then responsively transmit the respective notifications 434, 436, and 438 to the remote device(s) 422 indicating that the source device 404-1 is not recognized or is not allowed to proceed with its request. Responsively, the remote device(s) 422 block or deny the data request 430 to proceed such that a payload cannot be transferred to the remote device(s) 422.

In some embodiments, the remote device(s) 422 alternatively or additionally sends the authentication peer request 432 and generated timestamp straight to the source device 404. Accordingly, the source device 404 itself (either alone or in combination with the other source devices 402, 406, or 408) can determine if it is the device that transmitted the data request 430 (e.g., via the timestamp matching method described above). Responsively, the source device 404 in some embodiments transmits its own notification back to the remote device(s) 422 indicating whether it sent the data request 430. The remote device(s) 422, in response to receiving this notification, either denies or allows the data request 430 in particular embodiments.

Figure 5:
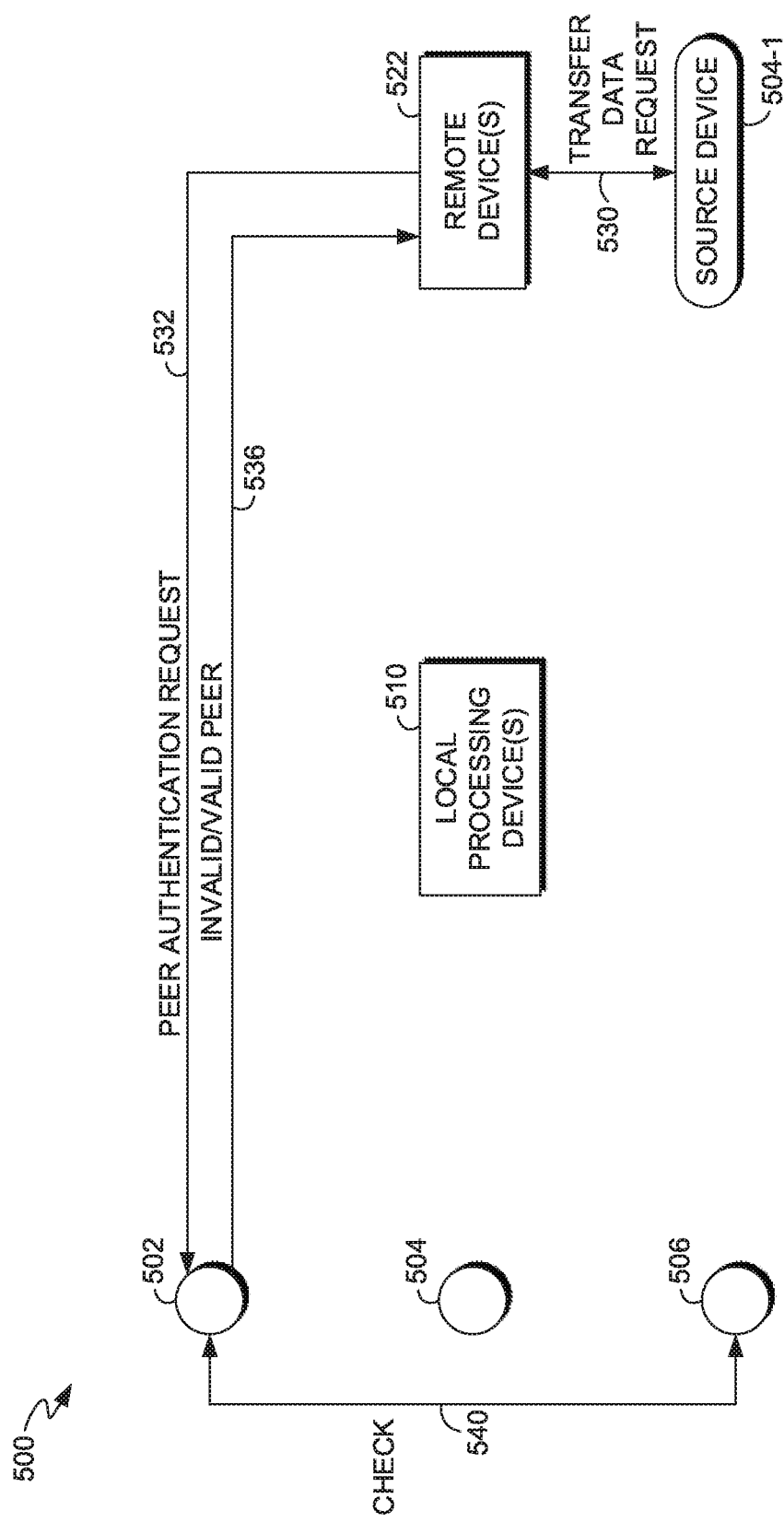
FIG. 5 is a schematic diagram illustrating how source devices can be validated in a computing environment, according to some embodiments.

FIG. 5 is a schematic diagram illustrating how source devices can be validated in the computing environment 500, according to some embodiments. FIG. 5 illustrates that a network can include a main check node (e.g., source device 502) that carries out authentication requests to other sources devices in addition to or alternative to one or more remote devices transmitting a peer authentication request to each source device in a network (e.g., similar to processes described in FIG. 1). Accordingly, only one or a selected few source devices in these embodiments receives the peer authentication request and the one or more selected few source devices perform checks or contact other source devices querying whether the other source devices recognize a source device.

The source device 504-1 sends the transfer data request 530 including its identifier identifying the source device 504-1 to the remote device(s) 522. Responsively, the remote device(s) 522 transmits the peer authentication request 532 and the identifier to the main check node source device 502. The peer authentication request 532 is indicative of querying if the main node 502 (and/or any other source device) recognizes the identifier of the source device 504-1. In some embodiments, the main node 502 not only checks to determine if it recognizes the source device 504-1 (e.g., via a data structure of identifiers, timestamps, etc.), but also sends a check out to the source device 506 indicative of a query of whether the source device 506 recognizes or can validate the identity of the source device 504-1 through its identifier. In response to receiving the check 540, the source device 504-1 also checks to determine if it recognizes the source device 504-1. In some embodiments, the check 540 is made alternatively or additionally to the source node 504, which is indicative of whether the source node 504 also recognizes the source device 504-1. In response to determining whether the source device 506 recognizes the source device 504-1, the source device 504-1 transmits a notification or check back to the source device 502 indicating whether or not it recognizes the source device 504-1. In response to the main node 502 receiving this notification or check, it then transmits a valid or non-valid peer notification indicating that the source device 504-1 or its identifier is recognized or not recognized. Responsively, the remote device(s) 522 deny or allow the transfer data request 530 to complete based on the contents of the invalid/valid peer request 536.

Figure 6:
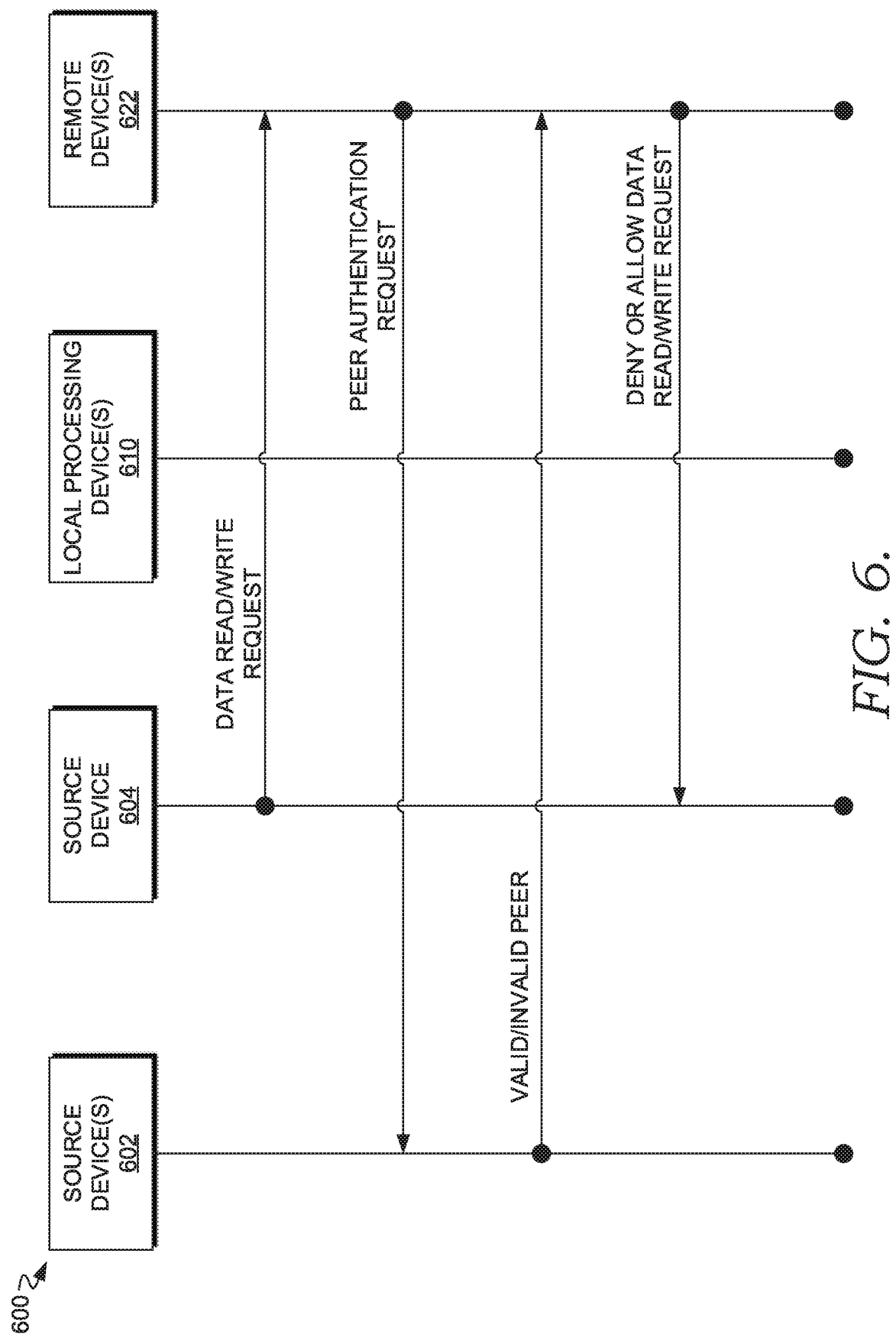
FIG. 6 is a sequence diagram illustrating each component involved in validating the source device 604, according to some embodiments.

FIG. 6 is a sequence diagram 600 illustrating each component involved in validating the source device 604, according to some embodiments. In some embodiments, the source device(s) 602 and/or 604 represents some or all of the same source devices described with respect to FIGS. 1-5 (e.g., the source devices 102). Likewise, the local processing device(s) 610 in various embodiments represents some or all of the same local processing device(s) described with respect to FIGS. 1-5. Further, in particular embodiments, the remote device(s) 622 represents the same or all of the remote devices as described with respect to FIGS. 1-5. In various embodiments, the diagram 600 illustrates processes that can occur within some or each of the environments 100, 200, 300, 400, and/or 500 as described herein.

The source device 604 (e.g., a smart thermostat) first issues a data read or write request to the local processing device(s) 610 and/or the remote device(s) 622. Accordingly, in some embodiments, the source device 604 issues a request to read data located within the remote device(s) 622 and/or the local processing device(s). In data read situations, data is therefore not requested to be written to or transferred to the remote device(s) 622. Rather, data is requested to be obtained from the remote device(s) 622. In some embodiments, the source device 604 issues a request to write (e.g., inject) or transfer data to the local processing device(s) 610 and/or the remote device(s) 622. In these situations, data is not requested to be read from the remote device(s). Rather, data is requested to be written or transferred to the remote device(s).

In some embodiments, the local processing device(s) 610 receive the data read/write request and transmits the request to the remote device(s) 622. In response to receiving the data read/write request, the remote device(s) 622 transmits a peer authentication request to the one or more source devices 602 indicative of whether the one or more source devices 602 recognize the source device 604.

The one or more source device(s) 602 then determine whether they recognize the source device 604 (e.g., via matching a stored identifier to an identifier of the source device 604) and/or whether the one or more source device(s) 602 authorize the data read/write request to be completed despite the source device being authenticated or recognized. If the one or more source devices 602 recognize and/or authorize the source device 604, the one or more source device(s) 602 sends a "valid" peer notification back to the remote device(s) 622 (and/or the gateway device(s) 610), which indicates that the one or more source devices recognize and/or authorize the source device 604 such that the data read/write request may continue (e.g., a payload may be sent to the remote device(s) 622). If the one or more source devices 602 do not recognize and/or do not authorize the source device 604 (e.g., because it failed timestamp criteria as described above), the one or more source device(s) 602 sends an "invalid" peer notification back to the remote device(s) 622 (and/or the gateway device(s) 610), which indicates that the one or more source devices do not recognize and/or do not authorize the source device 604 such that the data read/write request is denied or blocked (e.g., a payload is stopped from being sent to the remote device(s) 622).

In response to receiving the "valid" or "invalid" peer notification from the one or more source devices 602, the remote device(s) 622 either deny or allow the data read/write request. If the request is denied, communication with the source device 604 is cut off and the data read/write request is not completed. If the data read/write request is allowed to proceed, the source device 604 can read data and/or write or transfer data (e.g., a payload of sensor readings) to the remote device(s) 622. In some embodiments, in response to the read/write request proceeding to the remote device(s) 622 and the remote device(s) 622 analyzing the data, the remote device(s) 622 causes a control signal to be transmitted to one or more source device(s) (e.g., source device(s) 604 and/or 602) in order modify or alter a condition based on the read or payload content received from the source device 604. For example, if the source device 604 is authenticated and authorized according to the sequence diagram 600, the source device 604 may send a payload of sensor data to the remote device(s) 622 indicating that a threshold has been exceeded (e.g., a thermostat source device is reading above a threshold temperature). Responsively, the remote device(s) 622 can cause a control signal to be transmitted to back to the source device and/or another source device to modify an output (e.g., adjust the thermostat source device reading in order to keep a temperature below the threshold).

In additional or alternative embodiments, in response to the read/write request proceeding to the remote device(s) 622 and the remote device(s) 622 analyzing the data, the remote device(s) 622 causes a notification to be sent to one or more source device(s) (e.g., source device(s) 604 and/or 602) in order to notify a user or other device based on the read or payload received from the source device 604. For example, if the source device 604 is authenticated and authorized according to the sequence diagram 600, the source device 604 may send a payload of sensor data to the remote device(s) 622 indicating that a threshold has been met (e.g., a thermostat source device is reading above a threshold temperature). Responsively, the remote device(s) 622 can cause notification to be transmitted to back to the source device and/or another source device indicating that a threshold has been met (e.g., a smart speaker and/or a mobile device provides an output (e.g., an audible output or displayed notification) that the temperature is too low or high).

Figure 7:
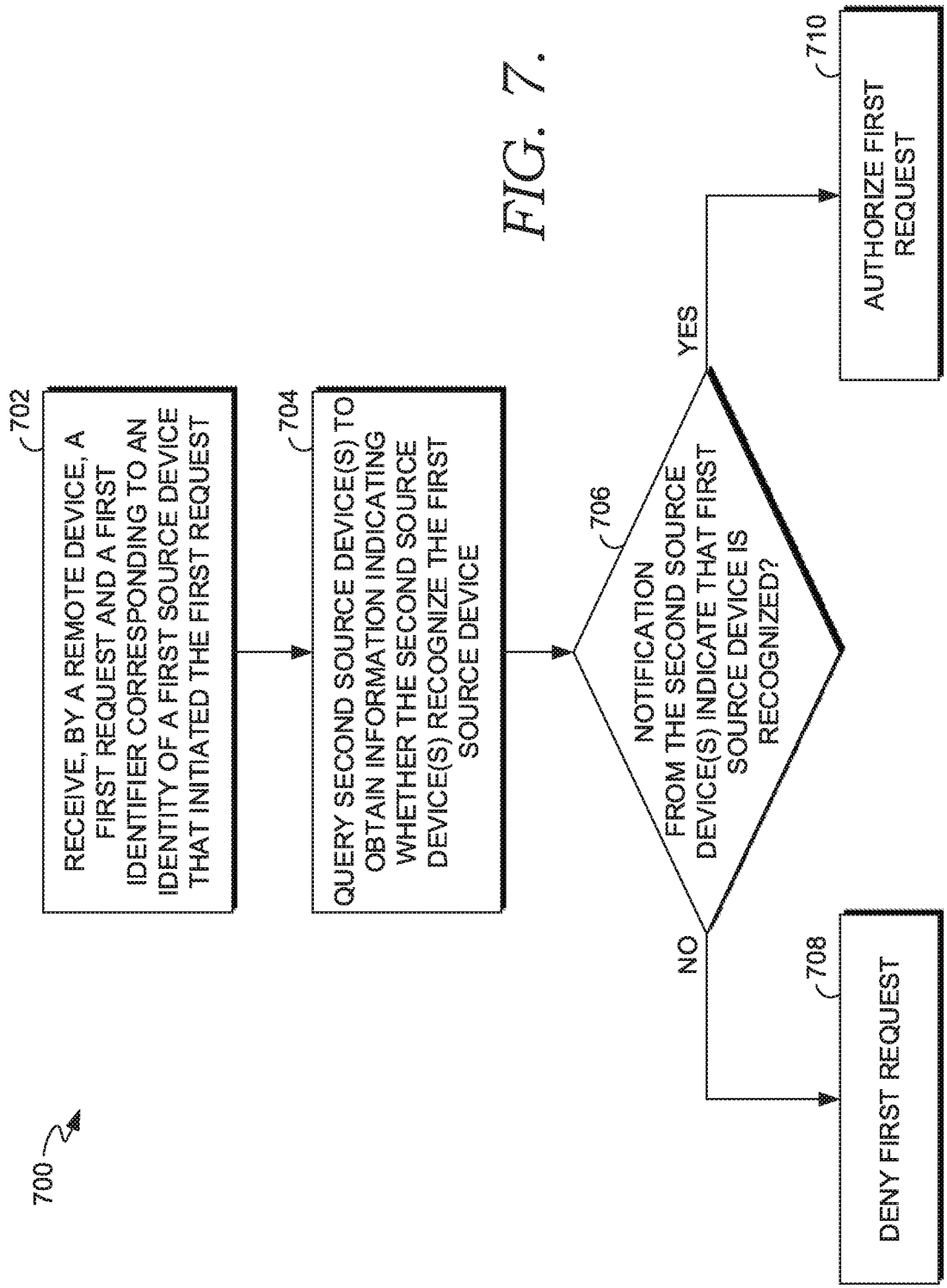
FIG. 7 is a flow diagram of an example process of a remote device denying or authorizing a first request, according to some embodiments.

FIG. 7 is a flow diagram of an example process 700 of a remote device denying or authorizing a first request, according to some embodiments. In various embodiments, the process 700 corresponds to some or each operations that the remote devices described with reference to FIGS. 1-6 can perform. The process 700 (and/or process 800 of FIG. 8) may be performed by processing logic that comprises hardware (e.g., circuitry, dedicated logic, programmable logic, microcode, etc.), software (e.g., instructions run on a processor to perform hardware simulation), firmware, or a combination thereof.

Per block 702, a remote device receives a first request and a first identifier corresponding to an identity of a first source device that initiated the first request. For example, referring back to FIG. 6, block 702 in some embodiments is identical to the data read/write request that the remote device(s) 622 receives from the source device 604 and/or the local processing device(s) 610.

Per block 704, the one or more remote devices queries one or more second source devices to obtain information indicating whether the one or more second source devices recognize the first source device. This query may include the identifier identifying the first source device. For example, referring back to FIGS. 2-6, the querying of the one or more second source devices in particular embodiments is indicative of transmitting a peer authentication request (e.g., 332 of FIG. 3) to each of the respective source devices.

Per block 706, it is determined whether a notification transmitted from the one or more second source devices indicate that the first source device or its identifier is recognized. For example in some embodiments, referring back to FIGS. 2-6, the received notification is identical to the valid/invalid peer notifications (e.g., 434 of FIG. 4) received from the respective source devices. Per block 710, if the notification indicates that the first source device is recognized, the first request is authorized or allowed to proceed. Accordingly, a source device may read or transmit a payload (e.g., sensor readings) to the remote device for further processing (e.g., causing a control signal to activate or modify a source device). Per block 708, if the notification from the one or more second source devices does not indicate that the first source device is recognized (or authorized), the first request is denied or blocked. Accordingly, the first source device is not able to read data from or transmit data to the remote device in these situations.

Figure 8:
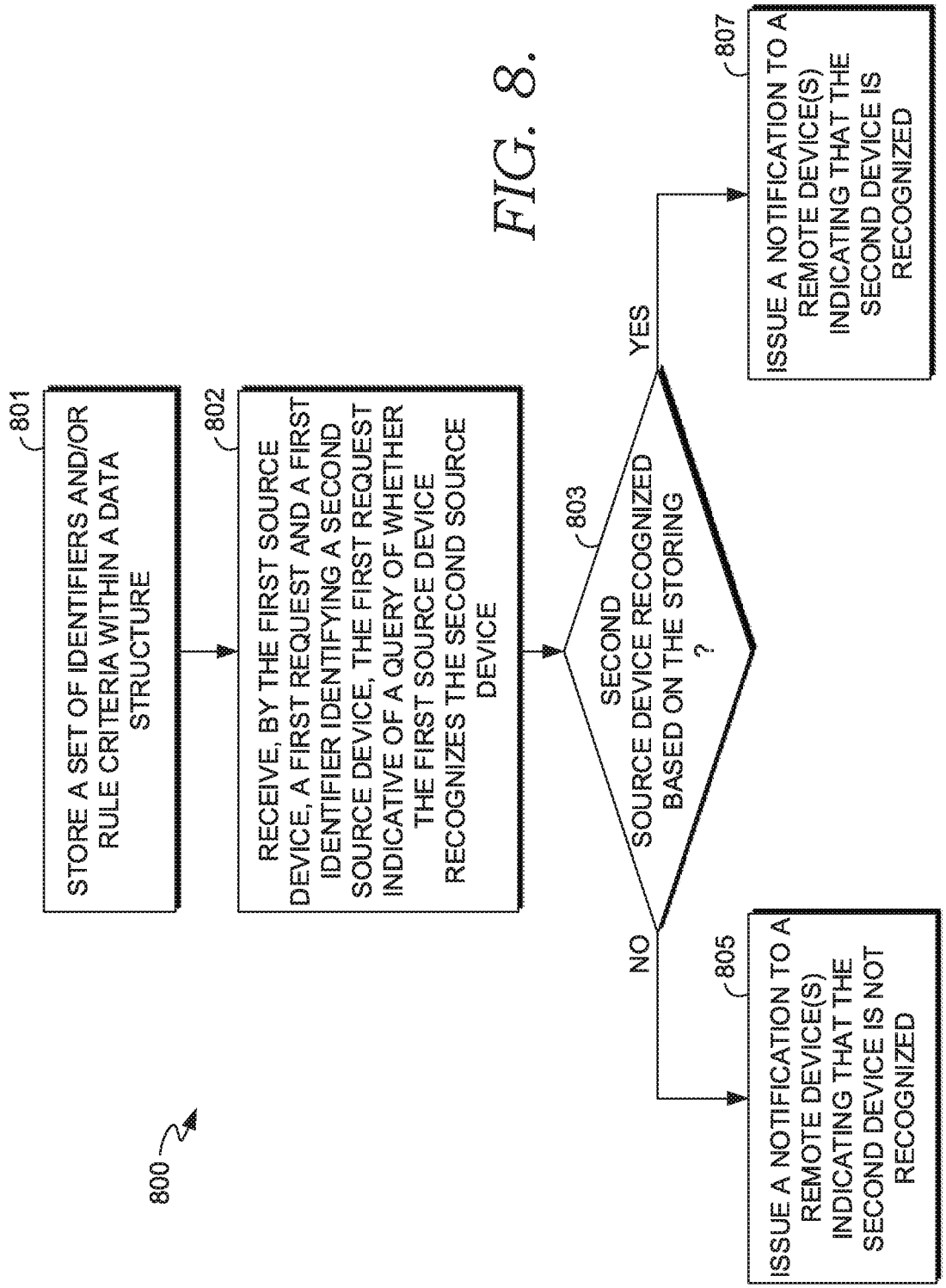
FIG. 8 is a flow diagram of an example process of a source device determining whether a second source device is recognized, according to some embodiments.

FIG. 8 is a flow diagram of an example process 800 of a source device determining whether a second source device is recognized, according to some embodiments. In various embodiments, the process 800 illustrates what functionality any of the source devices described with respect to FIGS. 1-6 (e.g., source device 102-1) can employ. Per block 801, a first source device stores a set of identifiers and/or rule criteria within a data structure. In particular embodiments, the storing at block 801 is indicative of registering each neighbor source device of the first source device before the first source device begins operations. For example, before the computing environment 100 is initialized, an administrator or other entity may generate a list or array data structure for the first source device, which corresponds to a set of identifiers that identify all of the sources devices that are within the same network as the first source device. Additionally or alternatively the administrator or other entity can input a set of rule criteria for the first source device for validating an identity of other source devices. For example, the rule criteria may be or include an operation for the first source device to store a timestamp of each time the first source device transmits data and a rule for the first source device to compare the stored time stamp values with time stamps values of particular requests (e.g., the peer authentication request 532 of FIG. 5) to determine whether there is a match for recognition and authentication purposes.

Per block 802, the first source device receives a first request and a first identifier identifying a second source device (e.g., a remote device). The first request is indicative of a query of whether the first source device recognizes (and/or authorizes) the second source device. For example, referring back to FIG. 3, the first request in particular embodiments is represented by the source device 302 and/or 306 receiving the peer authentication request 332. In another example, the receiving of the request at block 802 is illustrated by the receiving of the peer authentication request by the source device(s) 602 if FIG. 6 from the remote device(s) 622 of FIG. 6.

Per block 803, it is determined whether the first source device recognizes (and/or authorizes) the second source device based on the storing of data back at block 801. Block 803 can be performed in any suitable manner. For example in some embodiments, the first source device includes a data structure of listed identifiers corresponding to other source devices in the same network as the first source device. Accordingly, the first source device in some embodiments compares the first identifier to at least a second identifier included in the data structure to see if there is a match in identifiers. If the first identifier matches another stored identifier, the second device may be recognized, as this is indicative of the first identifier being within the data structure and thus part of the same network. If there is no match, there may be no recognition, which is indicative of the second source device not being within the same network. In another example, additionally or alternatively, further processing may be done to authorize a read/write request. For example, in some embodiments, the first request in particular embodiments is indicative of querying the first source device to obtain information indicating whether the valid second source device has transmitted any data prior to a data request (e.g., the data transfer request 330 of FIG. 3) within a threshold time period. The first request at block 802 includes a first timestamp identifier in some embodiments, which corresponds to when one or more remote devices received a data request from the second source device. In these embodiments, the first source device stores a data structure of timestamp values of when itself and/or other source devices have transmitted data. Accordingly, the first timestamp identifier is compared to a data structure of time stamp values to determine whether the first timestamp is within a threshold time of the other timestamp values. If the first timestamp identifier is within the threshold time of the other timestamp values, then the second source device is recognized and/or authorized to complete its data request. Alternatively, if the first timestamp identifier is not within the threshold time of the other timestamp values, then the second source device is not recognized and/or authorized to complete its data request.

In another example of how block 803 can occur, the first source device can continually communicate with other source devices and store time indications of when each source devices transmit their respective data. In this way an incoming time indication or timestamp can be compared against the stored time indications. For example, at a first time the first source device may store a first time indication associated with a time stamp at which a set of data was sent by particular source devices received by the first source device or remote device. It can then be determine that the first identifier of the second source device matches a second identifier of a source device. Then it may be determined whether the time stamp matches a time at which a data request to a remote device was submitted by the second source device or received by the remote device. Accordingly, the issuing of the notifications at blocks 805 and/or 807 is based on the determining whether the tie stamp matches the time at which the data request was submitted or received.

Per block 807, if the first source device recognizes and/or authorizes the second source device, a notification is issued (e.g., the valid peer notification 236 of FIG. 2) to one or more remote devices indicating that the second device is recognized. Responsively, the one or more remote devices can authenticate or allow a data request to proceed (e.g., block 710). Per block 805, if the first source device does not recognize and/or authorize the second source device, a notification is issued to the one or more remote devices indicating that the second source device is not recognized. Responsively, the one or more remote device can deny or block a data request (e.g., block 708).

Figure 9:
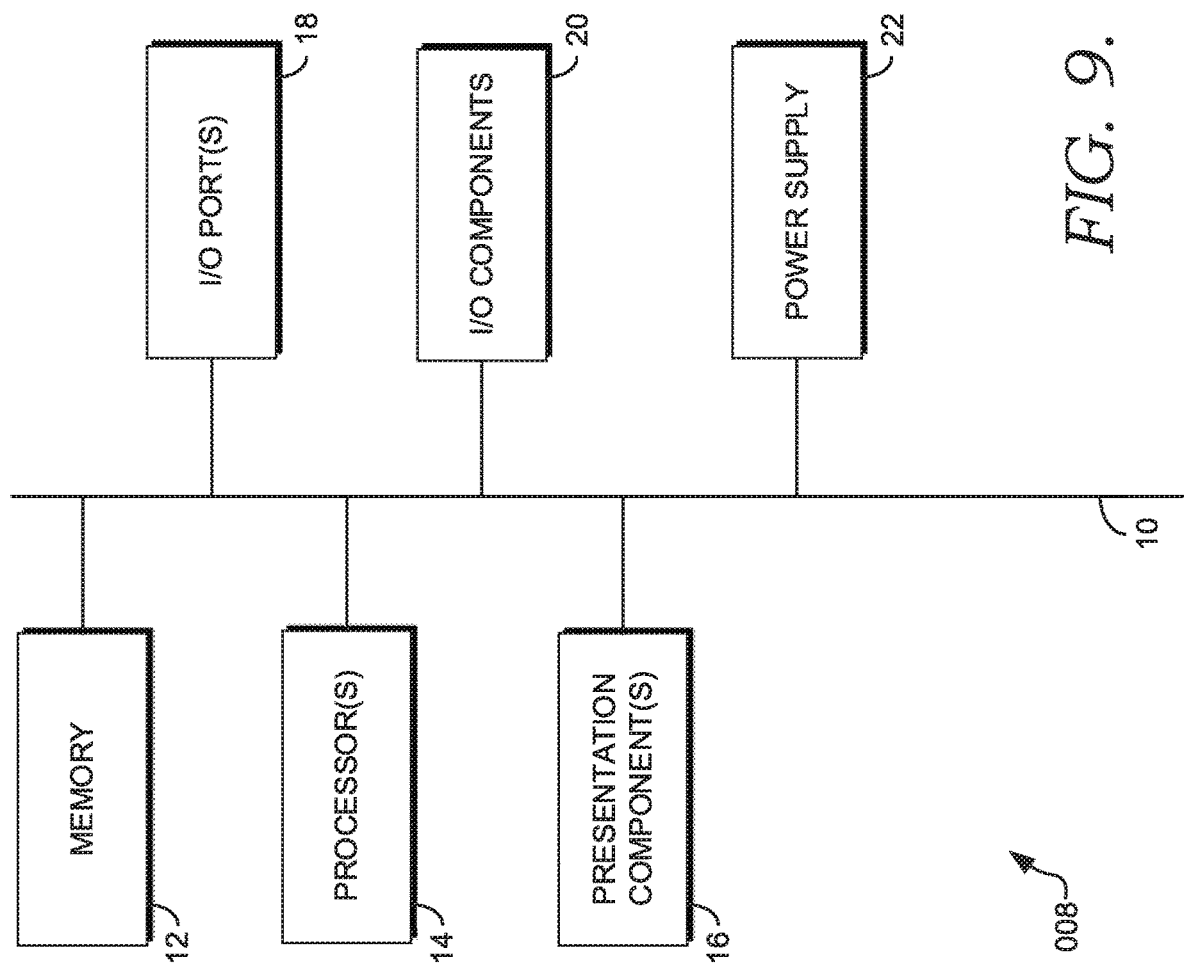
FIG. 9 is a block diagram of a computing device, according to some embodiments.

With reference to FIG. 9, computing device 008 includes bus 10 that directly or indirectly couples the following devices: memory 12, one or more processors 14, one or more presentation components 16, input/output (I/O) ports 18, input/output components 20, and illustrative power supply 22. Bus 10 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that this diagram is merely illustrative of an exemplary computing device that can be used in connection with one or more embodiments of the present invention. Distinction is not made between such categories as "workstation," "server," "laptop," "hand-held device," etc., as all are contemplated within the scope of FIG. 9 and reference to "computing device."

In some embodiments, the computing device 008 represents the physical embodiments of one or more systems and/or components described above. For example, the computing device 008 can be the user device(s) 702, 704, 706, 708, 802, and/or the control server(s) 720. The computing device 008 can also perform some or each of the blocks in the processes 500 and 600. It is understood that the computing device 008 is not to be construed necessarily as a generic computer that performs generic functions. Rather, the computing device 008 in some embodiments is a particular machine or special-purpose computer. For example, in some embodiments, the computing device 008 is or includes: a multi-user mainframe computer system, a single-user system, a symmetric multiprocessor system (SMP), or a server computer or similar device that has little or no direct user interface, but receives requests from other computer systems (clients), a desktop computer, portable computer, laptop or notebook computer, tablet computer, pocket computer, telephone, smart phone, smart watch, or any other suitable type of electronic device.

Computing device 008 typically includes a variety of computer-readable media. Computer-readable media can be any available media that can be accessed by computing device 008 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 008. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, etc. Computing device 008 includes one or more processors 14 that read data from various entities such as memory 12 or I/O components 20. Presentation component(s) 16 present data indications to a user or other device. Exemplary presentation components include a display device, speaker, printing component, vibrating component, etc.

I/O ports 18 allow computing device 008 to be logically coupled to other devices including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 008. The computing device 008 may be equipped with depth cameras, such as, stereoscopic camera systems, infrared camera systems, RGB camera systems, and combinations of these for gesture detection and recognition. Additionally, the computing device 008 may be equipped with accelerometers or gyroscopes that enable detection of motion.

The present disclosure may include a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Definitions

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "data store" as described herein is any type of repository for storing and/or managing data, whether the data is structured, unstructured, or semi-structured. For example, a data store can be or include one or more: databases, files (e.g., of unstructured data), corpuses, digital documents, etc.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

The terms first (e.g., first cache), second (e.g., second cache), etc. are not to be construed as denoting or implying order or time sequences unless expressly indicated otherwise. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

The term "causing" or "cause" means that one or more systems (e.g., computing devices) and/or components (e.g., processors) may in in isolation or in combination with other systems and/or components bring about or help bring about a particular result or effect. For example, a server computing device may "cause" a message to be displayed to a user device (e.g., via transmitting a message to the user device) and/or the same user device may "cause" the same message to be displayed (e.g., via a processor that executes instructions and data in a display memory of the user device). Accordingly, one or both systems may in isolation or together "cause" the effect of displaying a message.

The term "computing system" means a single computing device (e.g., a mobile device) and/or multiple computing devices (e.g., multiple cloud computing nodes).

A "computing device" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

A "session" can be initiated when a user logs into a site, or is recognized by the site as returning user who is associated with activity on the site. For example, a site may recognize a returning user via cookies. A session can be considered terminated after a user logs off of a site or becomes inactive (or idle) on the site for a predetermined period of time. For example, after 30 minutes of idle time without user input (i.e., not receiving any queries or clicks), the system may automatically end a session.

"Automatically" means "without any human intervention."

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

What is claimed is:

1. A computer-implemented method comprising:
receiving, by a remote device, a first data transfer request and a first identifier corresponding to an identity of a first source device that initiated the data transfer request;
in response to the receiving of the first data transfer request and the first identifier, transmitting, by the remote device, a first authentication request to a second source device and at least a third source device, the first authentication request is indicative of querying the second source device and the third source device to obtain information indicating whether the second source device and the third source device recognize the first source device, the second source device and the third source device are configured to periodically gather and transmit respective sets of data to one or more local processing devices for processing the respective sets of data, and wherein the one or more local processing devices are configured to transmit at least a portion of the respective sets of data to the remote device; and
denying or allowing, by the remote device, the first data transfer request to proceed based at least in part on whether the second source device and the third source device recognize the first source device.

2. The method of claim 1, further comprising:
receiving, from the one or more local processing devices and prior to the receiving of the first data transfer request, a second data transfer request originating from the second source device;
transmitting a second authentication request to the third source device to obtain information indicating whether the third source device recognizes the second source device; and
authorizing the second data transfer request based on the third source device recognizing the second source device.

3. The method of claim 1, further comprising:
receiving a first notification from the second source device and receiving a second notification from the third source device, the first notification and the second notification indicating that the first source device is not recognized; and
in response to the receiving of the first notification and the second notification indicating that the first source device is not recognized, denying the first data transfer request.

4. The method of claim 1, further comprising:
receiving a first notification from the second source device and receiving a second notification from the third source device, the first notification indicating that the first identifier is included in a first list of the second source device, the second notification indicating that the first identifier is included in a second list of the third source device; and
in response to the receiving of the first notification and the second notification, allowing the first data transfer request to proceed, wherein data is transferred to the remote device.

5. The method of claim 1, further comprising querying the second source device and the third source device to obtain information indicating whether the first source device has transmitted any data prior to the first data transfer request within a threshold time period, wherein the denying or allowing the first data transfer request is based further on whether the first source device has transmitted any data prior to the first data transfer request within the threshold time period.

6. The method of claim 1, wherein the second source device and the third source device are included in one or more tangible objects of a group of tangible objects consisting of: a consumer product, a vehicle, a wearable device, a sensor, a building structure, a smart home device, and a healthcare product.

7. The method of claim 1, wherein the one or more local processing devices include an edge node included in a first network of computing devices that process or store the respective sets of data locally, and wherein the edge node transmits, over a second network, subsets of the respective set of data to the remote device.

8. A system comprising:
at least one first source device having at least one processor; and
at least one computer readable storage medium having program instructions embodied therewith, the program instructions readable or executable by the at least one processor to cause the system to:
receive a first request that includes a first identifier identifying a second source device, the first request indicative of a query of whether the first source device verifies an identity of the second source device in order to complete a second request submitted by the second source device to transfer data;
determine whether second source device is authenticated;
based at least in part on the determining whether the second source device is authenticated, issue, to a remote device, a notification indicating whether the second source device is authenticated, the remote device denying or allowing the second source device to complete the second request to transfer the data based at least in part on whether the first device verifies the identity of the second device;

store a time indication associated with a time stamp at which a set of data was sent by a particular source device or received by the first source device;

determine that the particular source device has an identifier that matches the first identifier of the second source device; and determine whether the time stamp matches a time at which the second request was submitted or received, wherein the issuing of the notification indicating whether the second source device is recognized is further based on the determining whether the time stamp matches the time at which the second request was submitted or received.

9. The system of claim 8, wherein the program instructions further cause the system to store, prior to the receiving of the first request, a set of identifiers within a data structure, the set of identifiers corresponding to a set of source devices that are included in a same network as the first source device, the storing indicative of registering each neighbor source device of the first source device before the first source device begins operation.

10. The system of claim 9, wherein the determining whether the second source device is recognized includes comparing the first identifier to at least a second identifier included in the data structure.

11. The system of claim 8, wherein the determining whether the second device is authenticated includes:
determining that the first identifier matches a second identifier of a third source device; and
querying the third device to determine whether the third source device issued the second request, wherein the issuing of the notification indicating whether the second device is authenticated is based further on the querying of the third device.

12. The system of claim 8, wherein the first source device is included in one or more tangible objects of a group of tangible objects consisting of: a consumer product, a building structure, a home automation object, and a healthcare product.

13. The system of claim 8, wherein the denying or allowing the second source device to complete the second request to transfer data is based further on a third source device of the at least one first source device issuing, to the remote device, a second notification indicating whether the second source device is recognized.

14. A computer program product comprising a computer readable storage medium having program instructions embodied therewith, the program instructions readable or executable by one or more processors to cause the processor to:
receive a first request and a first identifier corresponding to an identity of a first source device that initiated the first request;
query at least a second source device to obtain information indicative of whether the first source device is authorized to complete the first request, the second source device is configured to periodically gather and transmit data, over one or more networks, to one or more local processing devices or one or more remote devices for data analysis;
blocking or authorizing the first request to proceed based at least in part on whether at least the first source device is authorized to complete the first request; and
query the second source device and a third source device to obtain information indicating whether the first source device has transmitted any data prior to the first request within a threshold time period, wherein the authorizing or blocking the first request is based further on whether the first source device has transmitted any data prior to the first request within the threshold time period.

15. The computer program product of claim 14, wherein the program instructions further cause the one or more processors to:
receive, from the one or more local processing devices and prior to the receiving of the first request, a third request originating from the second source device;
query a third source device to obtain information indicating whether the third source device recognizes the second source device as being authorized to complete the third request; and
authorizing the third request based on the third source device recognizing the second source device.

16. The computer program product of claim 14, wherein the program instructions further cause the one or more processors to:
receive a first notification from the second source device and receive a second notification from a third source device, the first notification and the second notification indicating that the first source device is not authorized to complete the first request; and
in response to the receiving of the first notification and the second notification indicating that the first source device is not authorized to complete the first request, denying the first request.

17. The computer program product of claim 14, wherein the program instructions further cause the one or more processors to:
receive a first notification from the second source device and receive a second notification from a third group of source devices, the first notification indicating that the first identifier is included in a first list of the second source device, the second notification indicating that the first identifier is included in a second set of lists of the third set of source devices; and
in response to the receiving of the first notification and the second notification, allowing the first request to proceed, wherein data is transferred to the one or more remote devices.

18. The computer program product of claim 14, wherein the one or more local processing devices include an edge node included in a first network of computing devices that process or store sets of data locally, and wherein the edge node transmits, over a second network, subsets of data of the sets of data to a remote device, the remote device corresponding to an internet-of-things service provider that further analyzes the subsets of data but not the sets of data.

* * * * *